United States Patent
Stoffel et al.

(10) Patent No.: US 11,042,209 B2
(45) Date of Patent: Jun. 22, 2021

(54) CONTROL OF THE ENERGY CONSUMPTION OF A SERVER CLUSTER

(71) Applicant: Bull SAS, Les-Clayes-Sous-Bois (FR)

(72) Inventors: Mathieu Stoffel, Grenoble (FR); Abdelhafid Mazouz, Le Chesnay (FR)

(73) Assignee: BULL SAS, Les Clayes-Sous-Bois (FR)

( * ) Notice: Subject to any disclaimer, the term of this patent is extended or adjusted under 35 U.S.C. 154(b) by 133 days.

(21) Appl. No.: 16/230,295

(22) Filed: Dec. 21, 2018

(65) Prior Publication Data

US 2019/0196572 A1     Jun. 27, 2019

(30) Foreign Application Priority Data

Dec. 22, 2017   (FR) ...................................... 1763075

(51) Int. Cl.
| | |
|---|---|
| G06F 1/32 | (2019.01) |
| G06F 9/50 | (2006.01) |
| G06F 11/30 | (2006.01) |
| G06F 1/3287 | (2019.01) |
| G06F 1/3228 | (2019.01) |

(52) U.S. Cl.
CPC .......... *G06F 1/3287* (2013.01); *G06F 1/3228* (2013.01); *G06F 9/5094* (2013.01); *G06F 11/3062* (2013.01)

(58) Field of Classification Search
CPC .... G06F 1/3287; G06F 1/3206; G06F 1/3228; G06F 9/5094; G06F 11/3206
See application file for complete search history.

(56) References Cited

U.S. PATENT DOCUMENTS

| | | | | |
|---|---|---|---|---|
| 8,639,818 | B1* | 1/2014 | Vladimirov | G06F 11/3452 709/226 |
| 2002/0152310 | A1* | 10/2002 | Jain | H04L 67/101 709/226 |
| 2011/0271283 | A1 | 11/2011 | Bell, Jr. et al. | |
| 2015/0378406 | A1* | 12/2015 | Berghe | G06F 1/3228 713/320 |

FOREIGN PATENT DOCUMENTS

| | | |
|---|---|---|
| EP | 2535855 A1 | 12/2012 |
| FR | 2980007 A1 | 3/2015 |
| FR | 3010552 A1 | 3/2015 |
| FR | 3031200 A1 | 7/2016 |

* cited by examiner

*Primary Examiner* — Stefan Stoynov
(74) *Attorney, Agent, or Firm* — Arc IP Law, PC; Joseph J. Mayo

(57) ABSTRACT

In this method for controlling a server cluster, the cluster Including a plurality of nodes, automated agents measure the change in at least one metric quantifying the use of the nodes for the execution of an application, the agents determine, for each node, by measuring the metric, whether a change of phase has taken place in the executed application, and cause a change of the operation of the node if necessary; at regular intervals, an automated coordinator aggregates the metric measurements and the changes of operation of the nodes that have taken place and, on the basis of the aggregated measurements, the coordinator sends instructions to at least one of the agents.

12 Claims, 2 Drawing Sheets

CONTROL OF THE ENERGY CONSUMPTION OF A SERVER CLUSTER

FIELD OF THE INVENTION

The invention relates to the control of a server cluster, particularly but not exclusively a server cluster belonging to the supercomputer category.

BACKGROUND OF THE INVENTION

A supercomputer is a computer designed to achieve the highest possible performance with the techniques known at the time of its design, particularly as regards the data processing speed, that is to say the computation speed. It is also called a high-performance computer. Conventionally, it is used for executing high-performance computation applications. It is used, for example, in the field of scientific computation. In order to enhance the performance that can be achieved by a supercomputer, it commonly takes the form of a server cluster comprising a plurality of nodes, each of these nodes comprising a plurality of computation cores.

The application executed by the supercomputer usually passes through several distinct phases. For example, there are intensive computation phases and phases with a high density of memory access. Depending on the current phase, the computation cores are deployed in different ways. Poor optimization of the use of the cores in operation for any given current phase may result in the retardation of the computation, in other words a degradation of the performance of the supercomputer, or an excessive energy consumption.

SUMMARY OF THE INVENTION

One aim of the invention is to optimize the energy consumption of such a server cluster without adversely affecting its performance in the execution of the application.

For this purpose, according to the invention, a method is provided for controlling a server cluster, the cluster comprising a plurality of nodes, in which:
- automated agents measure the change in at least one metric quantifying the use of the nodes for the execution of an application,
- for each node, the agents determine, by measuring the metric, whether a change of phase has taken place in the executed application, and cause a change in the operation of the node if necessary,
- at regular intervals, an automated coordinator aggregates the metric measurements and the changes in operation of the nodes that have taken place, and
- on the basis of the aggregated measurements, the coordinator sends instructions to at least one of the agents.

Thus, because of the automated agents and the measurement of the chosen metric, it is possible to detect phase changes in the application executed by the server cluster. As a result of this detection, the agents can launch actions affecting the nodes, more particularly their computation cores, in a way which is compatible with the phase in progress. The coordinator, which groups together the metric measurements and the changes in operation made by the agents, may be used to determine the change in the performance and energy consumption of the server cluster, both at the global level and at the scale of a single node. This information is then converted into instructions to be sent to the agents to refine the decisions taken regarding the nodes. In other words, the coordinator acts retroactively on the agents to optimize their decision-making regarding the nodes and to improve the efficiency of the server cluster.

Advantageously, each of the agents is assigned to a node in a one-to-one way.

Thus each node is controlled by its own agent.

Advantageously, before determining whether a phase change has taken place, each agent compares the measured metric value with one or more predetermined threshold values.

The phase change of the application is thus detected by comparison operations which are simple, fast and economical in terms of resources.

Preferably, the predetermined threshold values are modified dynamically on the basis of the effect of a change in operation of the node controlled by the agents.

This degree of freedom regarding the threshold values enables the method to adapt in real time to further refine the decisions taken.

Advantageously, the metric is chosen from the list consisting of the instantaneous energy consumption of the nodes, the number of instructions per processor cycle executed by computation cores of the nodes, the number of reads and/or writes to the file systems performed by the nodes, and the number of bytes sent and/or received in a network by the nodes.

These metrics are relevant for the discrimination of the phase types through which the application may pass.

Advantageously, the change in operation is chosen from the list consisting of the modification of the operating point (frequency, voltage) of the computation cores, the disabling of computation cores of the nodes having no workload, and the modification of the assignment of tasks to the computation cores.

The operating point (frequency, voltage) is commonly denoted by the English expression "P-state". These changes enable the operating parameters of the components of the server cluster to be adapted efficiently to the phase through which the executed application is passing, in order to optimize the energy consumption created by the application.

Advantageously, the control of the change of operation of the nodes by the agents takes into account predetermined models for predicting the performance of the nodes and/or the energy consumed by the nodes.

By taking these prediction models into account, the possible results of the changes of operation of the nodes can be anticipated. Thus the agents are capable of taking decisions which are well-founded and therefore more relevant.

Advantageously, the coordinator aggregates the metric measurements and the changes of operation of the nodes every ten to thirty seconds, or preferably every fifteen seconds.

This frequency is high enough to provide regular monitoring of the agents and low enough to avoid creating excessive communication between the coordinator and the agents, which would increase the resources required to implement the method.

Advantageously, the data sent by the agents to the coordinator comprise a list of the sequences of phases encountered by the nodes, statistics on the measurements of values of the metric, information on the performance of the nodes, and/or information on the energy consumption of the nodes.

The coordinator can thus make a full and precise evaluation of the results in terms of the performance and energy consumption of the server cluster.

Preferably, the coordinator interrogates the agents in turn, using the "round-robin unicast" model for example.

This can avoid disturbance to the inter-node communications associated with the execution of the application, which would adversely affect the performance of the server cluster.

Advantageously, the coordinator determines, on the basis of the aggregated measurements, whether the global energy consumption of the server cluster has increased or decreased, and whether the energy consumption of each of the nodes has increased or decreased.

The coordinator can thus determine whether the agents have been effective and can request agents that are the source of poor decisions to give different instructions to the nodes assigned to them.

Advantageously, the method is implemented in the context of high-performance computation.

Since high-performance computation is a type of application that consumes a large amount of energy, the optimization of this consumption is even more important.

The invention also provides for a computer program comprising coded instructions adapted to command the performance of the steps of a method as described above when it is executed on a computer.

The invention further provides for a method of making the above program available for downloading on a telecommunications network.

Additionally, the invention provides a device for controlling a server cluster, capable of:
measuring the change in at least one metric quantifying the use of nodes of the server cluster for the execution of an application,
determining for each node, by measuring the metric, whether a change of phase has taken place in the executed application, and causing a change of the operation of the node if necessary,
at regular intervals, aggregating the metric measurements and the changes of operation of the nodes, and
on the basis of the aggregated measurements, sending instructions for a change of operation to the nodes.

Additionally, the invention provides a system comprising a control device as described above and a server cluster.

Other objects of the present invention and its particular features and advantages will become more apparent from consideration of the following drawings and detailed description of the invention.

BRIEF DESCRIPTION OF THE DRAWINGS

An embodiment of the invention will now be described by way of non-limiting example, with the aid of the attached drawings, in which.

DETAILED DESCRIPTION OF THE INVENTION

The following detailed description illustrates the technology by way of example, not by way of limitation of the principles of the invention. This description will enable one skilled in the art to make and use the technology, and describes several embodiments, adaptations, variations, alternatives and uses of the invention, including what is presently believed to be the best mode of carrying out the invention. One skilled in the art will recognize alternative variations and arrangements, and the present technology is not limited to those embodiments described hereafter.

Figure 1:
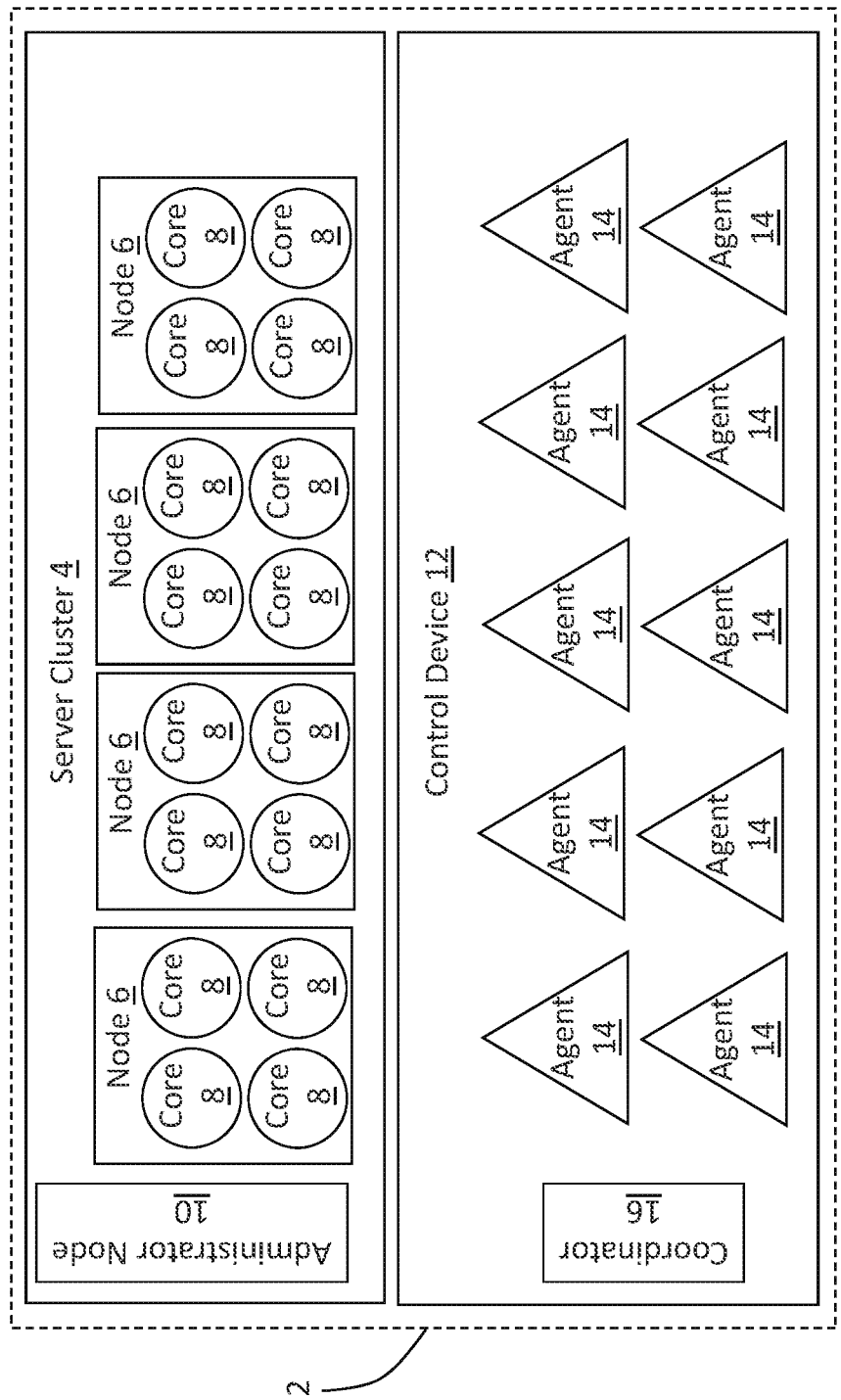
FIG. 1 is a diagram illustrating a computation system according to particular embodiments of the present invention.

FIG. 1 shows a computer system 2 according to the invention. It comprises a server cluster 4 intended to execute an application. The application may, for example, be an application comprising high-performance computation, in which case the server cluster 4 is a supercomputer. However, provision may be made for it to be any other type of application.

The server cluster 4 comprises a plurality of nodes 6 which are interconnected. Each of these nodes comprises a plurality of computation cores 8, each of these computation cores 8 being responsible for executing part of the application. The server cluster 4 further comprises an administrator node 10 organizing the distribution of the execution of the application by the nodes 6.

The system 2 also comprises an automated control device 12 connected to the server cluster 6 and capable of controlling it. The device 12 comprises two types of components: agents 14 and a coordinator 16. The agents 14 and the coordinator 16 comprise computer programs which are executed, respectively, by the nodes 6 and the administrator node 10. It is also said that the agents 14 and the coordinator 16 are executed, respectively, on the nodes 6 and the administrator node 10. Another possible formulation is that the nodes 6 and the administrator node 10 are the respective execution resources of the agents 14 and the coordinator 16. Here, the number of agents 14 is equal to the number of nodes 6 in the server cluster 4, each of the agents 14 being assigned to a node 6 in a one-to-one way.

The agents 14 measure the change in metrics which form characteristic quantities of the state of the nodes 6. On the basis of these measurements, the agents 14 decide on, and execute, actions intended to reduce the energy consumption of the nodes 6, while preserving the performance of the executed application.

At regular intervals, the operating data of the agents 14 are consolidated by the coordinator 16. This is done in order to analyse the effect of the decisions taken locally by the agents 14 on the performance and energy consumption of the nodes 6 involved in a given computation. The purpose of the consolidation is to provide a global view of the performance and the energy consumption of the server cluster 4. With the aid of these consolidated data, it is possible to refine the decisions taken at the level of each agent 14 locally, thus ensuring uniform global progress in order to meet time constraints and achieve minimal energy consumption.

Thus, the device 12 may be used for executing a method for controlling the server cluster 4, wherein:
the agents 14 measure the change in at least one metric quantifying the use of the nodes 6 for the execution of the application,
the agents 14 determine, for each node 6, by measuring the metric, whether a change of phase has taken place in the executed application, and cause a change of the operation of the node 6 if necessary,
at regular intervals, the coordinator 16 aggregates the metric measurements and the changes of operation of the nodes 6 that have taken place, and
on the basis of the aggregated measurements, the coordinator 16 sends instructions to at least one of the agents 14.

Figure 2:
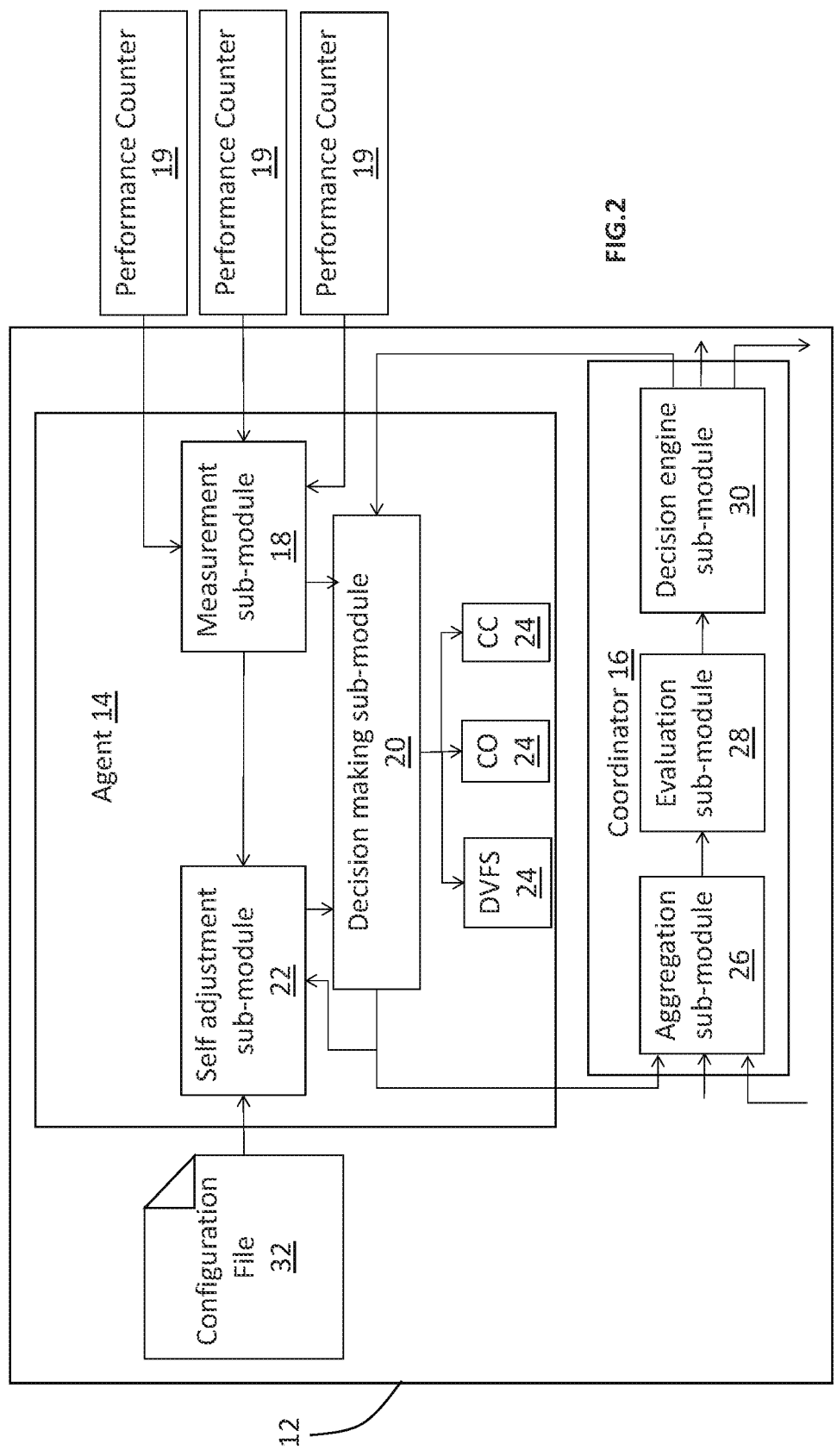
FIG. 2 is a diagram showing the constituent elements of a device for the automatic control of the computer system according to particular embodiments of the present invention depicted in FIG. 1.

The device 12 will now be described in greater detail, starting with its agents 14, with the aid of FIG. 2. In the following text, only one of the agents 14 and the node 6 assigned to it will be mentioned, on the understanding that the other agents 14 and the other nodes 6 are similar.

The agent 14 comprises a measurement sub-module 18, capable of measuring characteristic metrics or quantities of the use of the server cluster 4 at regular intervals. The number of instructions per processor cycle executed by the computation cores 8 and their instantaneous energy consumption are two examples of metrics. The agent 14 is also capable of collecting high-level metrics of the operating system, such as the number of reads and/or writes in parallel file systems or the number of bytes sent and/or received in a network. These measurements may be used to monitor the change of the metrics in the course of the execution of the application, by subtraction between two consecutive readings.

To gain read access to performance counters 19, the device 12 preferably uses the C library libpfm for the hardware performance counters and the metrics provided by the operating system. However, other options are available. A first example is the C library PAPI, which is a high-level collector library of performance counters. It provides access to a number of components, including the operating system. It makes use of the C library libpfm for accessing hardware performance counters. A second example is provided by the MSR registers of a processor of the server cluster 4 which may be used to measure certain characteristic quantities, although the choice of these is restricted to hardware performance counters for processors. These libraries and registers are well-known to those skilled in the art, and consequently will not be described further.

The reading of the power consumed by the computation node is obtained by using an integrated circuit specific to a function, more commonly known by the abbreviation ASIC, standing for the English terms "application-specific integrated circuit", and a network of in situ programmable gates, more commonly known by the acronym FPGA, standing for the English terms "field-programmable gate array", for example installed on a board holding the nodes 6. An example of an ASIC/FPGA is HDEEM. These elements may be used for physically sampling the energy consumption of the various elements of the node 6 at a frequency in the vicinity of one kilohertz, using hardware probes. This provides access to the global energy consumption of the node 6, and also to its various constituents such as the processor sockets, the RAM memory or the processor interconnection network. In a variant, an RAPL (an acronym standing for the English terms "running average power limit") interface provides access to the energy consumption of the processor, notably the computation cores, and the RAM memory connected to its memory bus. However, the power consumption readings offer less granularity, and the way in which the energy consumption is obtained is not known with certainty. According to another variant, an on-line wattmeter could be used, but this would require the physical instrumentation of each node 6. Consequently, this is not viable if the number of nodes 6 is too high.

The agent 14 comprises a decision-making sub-module 20 which has the purpose of determining, on the basis of the metric readings carried out by the measurement sub-module 18, whether there has been a change of phase in the application and whether action needs to be taken as a consequence. The decisions are implemented in the form of parameterized binary decision trees. For example, a predetermined threshold value on the number of instructions executed per processor cycle is defined. If the measured value is greater than the threshold value, the phase through which the application is passing is an intensive computation phase. An action may then be launched, for example modifying the frequency of the computation cores 8.

The agent 14 comprises a self-adjustment sub-module 22. Returning to the example above, the threshold value and the frequency to be set are two parameters which are dynamically modified by the self-adjustment sub-module 22 to seek the best possible optimization.

The self-adjustment sub-module 22 needs to be able to evaluate the performance of the server cluster 4. This is because the aim of the device 12 is to maximize the energy efficiency, in other words to maximize the performance of the server cluster 4 and minimize the energy consumed by the system 2. The purpose of the self-adjustment sub-module 22 is to evaluate the effect of a decision on the performance of the server cluster 4, and to adapt the parameters of the decision tree associated with said decision so as to avoid degrading the performance. The adaptation of the parameters, which may extend as far as disabling a decision tree, may, for example, follow a linear path algorithm of the possible values, or a dichotomy search algorithm.

The self-adjustment sub-module 22 may also implement proactive policies based on models for predicting the performance or the energy consumption of the future phases. The aim is to greatly improve the efficiency of the decision-making sub-module 20 of the agent 14. These models may or may not depend on the underlying hardware and the execution environment. Such models have as their input a set of metrics such as the number of instructions per processor cycle, the intensity of memory access, the number of inputs/outputs, or the operating frequency of the computation cores 8. On the basis of these measurements, they estimate the expected performance and the energy consumed for a number of configurations of the server cluster 4. It will then be possible to evaluate the effect of a decision in terms of performance and energy consumed before applying it, thereby avoiding taking decisions that would degrade performance or increase energy consumption.

In order to evaluate the performance of the application, a hypothesis is proposed and verified for almost all the applications. In fact, it is assumed that high-performance computation applications consist of a main computation kernel which is executed many times consecutively to process a set of input data and produce a result. On the launch of the application, the device 12 measures the number of instructions executed, or any other relevant performance metric, over a time interval which is longer than the duration of a phase and shorter than the duration of the execution of the application. In terms of magnitude, the duration of a phase is of the order of not more than ten milliseconds, while the duration of the execution of an application is several hours at least. Thus the device 12 will, for example, measure the number of instructions executed during about ten seconds, without making a decision, in nominal execution conditions, several times consecutively. The self-adjustment sub-module 22 will thus have a reference in terms of performance, namely the number of instructions executed over a period of about ten seconds, the amount of energy consumed over the same period. The initial phase of calibrating the self-adjustment sub-module 22 will be continued until the readings converge. Similarly, the initial configuration of the self-adjustment sub-module 22 will make it possible to modify the parameters of the calibration phase, such as the duration of the calibration period.

Other solutions may be envisaged for measuring the performance of the application and thus enabling the self-adjustment sub-module 22 to adapt the decision-making sub-module 20.

A first variant is to determine the sequence of phases characteristic of the main loop for the purpose of measuring the associated execution time and thus evaluating the effect of the decisions that will be taken. To identify said phase sequence, an algorithm for searching for a periodic sequence in a succession may be applied.

A second variant consists in identifying the main loop during the compilation of the application, and annotating it so that the device 12 is notified of the start and end of each iteration. This functionality will be implemented by means of a module of the compiler. Since each iteration is delimited, the self-adjustment sub-module 22 would be able to measure the mean execution time of an iteration and to evaluate the effect of the decisions taken by the device 12 on the performance.

According to a third variant, the input and output points associated with the manufacturers of execution resources such as OpenMP or MPI, known to those skilled in the art, are captured dynamically. This may be implemented by means of a functionality of overloading the operators at the launch of the applications, using the environment variable LD_PRELOAD in GNU/Linux systems. Whenever an overloaded operator is captured, an instrumentation routine is executed. The latter has the function of notifying the device 12 of an event, then calling the original version of the overloaded operator. Such a method would provide high flexibility and would not be restricted to a particular version or a specific implementation of an execution resource such as OpenMP or MPI.

The agent 14 comprises an actuator sub-module 24 which has the purpose of implementing the mechanisms underlying an action that may be taken by the device 12. In this sense, new actuators may be developed in response to the enrichment of the decision-making sub-module, for example following the launch of new processor or RAM memory technology. It is therefore almost impossible to describe all the actuators that may be integrated into the device 12. However, there are three indispensable actuators.

The first is the "Dynamic Voltage and Frequency Scaling" (DVFS) actuator. The purpose of DVFS techniques is to reduce the operating frequency and voltage of a component in order to reduce its energy consumption. Thus, during phases in which the computation cores 8 cannot operate at full speed without adversely affecting performance, their operating frequencies may be reduced to save energy. The DVFS actuator of the device 12 uses direct writes to MSR registers of the processor in order to modulate the frequency and voltage pair of the computation cores 8. It would also be possible to use writes to the virtual files provided by the Linux core, under the path /sys/devices/system/cpu.

The second actuator is the "core offliner" (CO) actuator. The purpose of this actuator is to disable the computation cores 8 when these have no workload, for example during intermediate back-ups of an application, which may take the form of shared phases of writing to disc during which only some of the computation cores 8 execute instructions. In the same way as for the DVFS actuator, a computation core 8 may be disabled by means of virtual files under the path /sys/devices/system/cpu.

The third actuator is the "core consolidator" (CC) actuator. The purpose of this actuator is to modify the affinity of the processes of an application when the processes are not making the best use of the computation cores 8 to which they are assigned. We may, for example, consider the case of an application composed of four processes, of which two are executed on a first computation core with a core usage rate of 100%, one is executed on a second core creating a usage of 50%, and the last is executed on a third core, also creating a usage of 50%. In this case, the function of the core consolidator actuator will be to assign the two processes being executed on the second and third computation cores to the same single computation core. Thus the released computation core may be disabled by means of the aforementioned core offliner actuator, resulting in a decrease in energy consumption without affecting the performance of the server cluster. The manipulation of the affinity of the processes may be implemented by using the sched_setaffinity function of the sched.h module in C language.

The coordinator 16 comprises an aggregation sub-module 26 for aggregating the data received from the agents 14. At regular intervals, typically once every ten to thirty seconds, for example once every fifteen seconds, the aggregation sub-module 26 requests the agents 14 to send it information about their operation. This information comprises the sequence of phases found, statistics on the metric measurements such as the minimum and maximum values observed, the mean value or the quartiles, data on the evaluation of the performance of the nodes 6, for example the performance acceleration/retardation factor, and the energy consumption of the nodes 6, notably.

The communication between the agents 14 and the coordinator 16 takes place according to a round-robin unicast model, using the TCP protocol for the transmission layer. In other words, the aggregation sub-module 26 interrogates each agent 14 in turn. Additionally, the communication takes place "out of band", that is to say by using an Ethernet management network of the server cluster 4. This can avoid disturbance to the inter-node communications associated with the execution of the application, even though the volume of data exchanged is reduced. This volume is usually of the order of a kilobyte per agent 14 per transmission. Thus, if the scaling-up of out-of-band communications between the agents 14 and the coordinator 16 is not verified, the fast inter-node interconnection network can be used without significantly perturbing the performance of the executed application.

The coordinator 16 comprises an evaluation sub-module 28 for verifying that the scaled-up performance of the server cluster is not perturbed by the actions of the agents 14 on the nodes 6, and for evaluating the reduction in energy consumed by the server cluster 4. For this purpose, it makes use of the aggregated readings of performance and energy consumption received from the agents 14. It may determine which nodes 6 are responsible for a degradation in performance and/or a rise in energy consumption, or which is the best form of energy consumption optimization achieved by the agents 14, and may transmit this information to a decision engine sub-module of the coordinator 16 which is described below.

The evaluation sub-module 28 may analyse the time-stamped sequences of phase detection in order to identify imbalances in the workload. This is because, if the computation phases are shorter on average in one node 6 than in another although the operating frequencies of their computation cores 8 are identical, this may mean that the amount of work to be done by the first node is less than that of the second node.

The coordinator 16 comprises a decision engine sub-module 30 which has two main functions.

Firstly, it converts the diagnosis made by the evaluation sub-module 28 into instructions for transmission to the agents 14. For example, if the evaluation sub-module 28 has found that an agent 14 appears to be satisfied with a sub-optimal reduction in energy consumption, the decision engine sub-module 30 informs the agent 14 in question that a better optimization is possible. The agent 14 then repeats the self-adjustment procedure described above with more aggressive parameters, to achieve a better reduction in energy consumption. The data transmission takes place in the same way as for the transfer of data from the agents 14 to the aggregation sub-module, namely in turn according to a round-robin unicast model, using the TCP protocol.

Secondly, it forms a safeguard. If the performance of the server cluster at the global scale is degraded, it controls the decision-making sub-modules 20 of the agents 14 assigned to the nodes 6 having the most unfavourable reports in terms of performance and/or energy consumption, so that they take more conservative decisions. For example, it may order the disabling of a decision tree, or limit the authorized reduction in frequency of the computation cores 8. Moreover, if the performance of the server cluster 4 is degraded and the attempted adjustments have been ineffective, it may reinitialize the device 12 as a whole. After a sequence of failures, revealing the inability of the device 12 to optimize the energy consumption of the executed application, it may even suspend the action of the device 12 as a whole.

The internal mechanisms of the decision engine sub-module 30 are implemented with the aid of binary decision trees.

After the installation of the device 12, an initial calibration phase allows the adaptation of the default values of the decision-making modules of the agents 14. This is because the characteristics of hardware components using different technologies may vary widely. Therefore the maximum number of instructions executed per processor cycle if the "pipelines" (as they are known in English) of the computation cores 8 are saturated differs significantly. For example, the thresholds relating to the number of instructions executed per processor cycle must be adapted.

For this purpose, a set of calibration tests is executed on the installation of the device 12. For example, again with regard to the number of instructions executed per processor cycle, tests applying a gradual workload and number of memory accesses may be used to determine the maximum value associated with this characteristic, and the way in which it changes when there is a large amount of traffic to the RAM memory. On the basis of these observations, the threshold delimiting, for example, an intensive computation phase of a memory access phase may be adjusted.

As explained above, during the execution of the application, the parameters of the decision-making sub-modules 20 of the agents 14 are progressively refined by means of their self-adjustment sub-modules 22. While the adjustments relating to the hardware architecture are associated with the initial calibration, these refinements can be associated with the executed application, and with its initial data set. When the execution of the application is finished, the device backs up its final state in a configuration file 32, notably the parameters of the decision-making sub-modules of the agents 14. The user may therefore use the configuration file 32 to initialize the device 12. Thus, if the same application is to be executed again in the same server cluster 4 and with a data set similar to that used for the execution which produced the configuration file 32 of the device 12, the device may be initialized with a quasi-final state, thereby greatly accelerating the process of searching for the best possible energy optimization.

The invention is not limited to the embodiments described, and other embodiments will be readily apparent to those skilled in the art.

What is claimed is:

1. A method for controlling a cluster comprising a server cluster, the cluster comprising nodes comprising a plurality of nodes, wherein:
    automated agents measure change in at least one metric quantifying use of the nodes for execution of an application, the at least one metric being chosen from a group consisting of: a number of instructions per processor cycle executed by computation cores of the nodes, a number of reads and/or writes to file systems performed by the nodes, and a number of bytes sent and/or received in a network by the nodes,
    the automated agents determine, for each node, by measuring the at least one metric, whether a change of phase has taken place in the application, and cause a change of operation of the node if necessary,
    at regular intervals, aggregating via an automated coordinator the at least one metric measurements into an aggregated at least one metric measurements and the changes of operation of the nodes that have taken place, and
    based on the aggregated at least one metric measurements, sending instructions via the coordinator to at least one of the automated agents.

2. The method according to claim 1, wherein, before determining whether a phase change has taken place, each agent compares the at least one metric measured with one or more predetermined threshold values.

3. The method according to claim 2, wherein the predetermined threshold values are modified dynamically based on an effect of a change in operation of the nodes controlled by the agents.

4. The method according to claim 1, wherein the change of operation is chosen from a group consisting of: modification of an operating point, which includes frequency and voltage of the computation cores, disabling of the computation cores of the nodes having no workload, and modification of an assignment of tasks to the computation cores.

5. The method according to claim 1, wherein control of the change of operation of the nodes by the automated agents takes into account predetermined models for predicting performance of the nodes and/or energy consumed by the nodes.

6. The method according to claim 1, wherein the coordinator aggregates the at least one metric measured and the changes of operation of the nodes every ten to thirty seconds.

7. The method according to claim 6, wherein the coordinator aggregates the at least one metric measurements and the changes of operation of the nodes every fifteen seconds.

8. The method according to claim 1, wherein data sent by the agents to the coordinator comprise a group consisting of: sequences of phases encountered by the nodes, statistics on the measurements of values of the metric, information on the performance of the nodes, information on energy consumption of the nodes and combinations thereof.

9. The method according to claim 8, wherein the coordinator interrogates the agents in turn, using a round-robin unicast model.

10. The method according to claim 1, wherein the coordinator determines, based on the aggregated measurements, whether global energy consumption of the server cluster has increased or decreased, and whether the energy consumption of each of the nodes has increased or decreased.

11. The method according to claim 1, implemented in a context of high performance computation.

12. A device for controlling a server cluster, wherein it is configured for:
- measuring a change in at least one metric quantifying use of nodes of a server cluster for execution of an application, the at least one metric being chosen from a group consisting of: a number of instructions per processor cycle executed by computation cores of the nodes, a number of reads and/or writes to file systems performed by the nodes, and a number of bytes sent and/or received in a network by the nodes,
- determining for each node, by measuring the at least one metric, whether a change of phase has taken place in the application, and causing a change of operation of the node if necessary,
- at regular intervals, aggregating the at least one metric measurements and the changes of operation of the nodes, and
- based on the aggregated at least one metric measurements, sending instructions for a change of operation to the nodes.

* * * * *